United States Patent [19]
Gaylord

[11] 4,202,955
[45] May 13, 1980

[54] COPOLYMERS OF CYCLIC CONJUGATED DIENES AND MALEIC ANHYDRIDE

[75] Inventor: Norman G. Gaylord, New Providence, N.J.

[73] Assignee: Borg-Warner Corporation, Chicago, Ill.

[21] Appl. No.: 858,757

[22] Filed: Dec. 8, 1977

Related U.S. Application Data

[63] Continuation of Ser. No. 641,215, Dec. 16, 1975, abandoned, which is a continuation-in-part of Ser. No. 470,705, May 16, 1974, abandoned.

[51] Int. Cl.$^2$ ............................................. C08F 220/08
[52] U.S. Cl. ................................................... 526/272
[58] Field of Search ................................ 526/272, 308

[56] References Cited

U.S. PATENT DOCUMENTS

| | | | |
|---|---|---|---|
| 3,838,113 | 9/1974 | Smallman | 260/78.5 R |
| 3,957,736 | 5/1976 | Tsuchiya | 526/272 |

*Primary Examiner*—Paul R. Michl
*Attorney, Agent, or Firm*—Richard J. Schlott

[57] ABSTRACT

Novel 2:1 copolymers of maleic anhydride and cyclic conjugated dienes such as cyclopentadiene. The saturated copolymers are prepared by heating the cyclic diene and maleic anhydride in the presence of a free radical precursor, such as a peroxygen compound, at a temperature at which the catalyst half life is no more than 2 hours.

1 Claim, No Drawings

COPOLYMERS OF CYCLIC CONJUGATED DIENES AND MALEIC ANHYDRIDE

CROSS-REFERENCE TO RELATED APPLICATIONS

This application is a continuation of U.S. application Ser. No. 641,215, filed Dec. 16, 1975, now abandoned, which was a continuation-in-part of U.S. application Ser. No. 470,705, filed May 16, 1974, now abandoned.

This invention relates to novel copolymers of maleic anhydride and certain conjugated dienes, and more particularly to novel copolymers of maleic anhydride and cyclic conjugated dienes. This invention also pertains to a process for preparing such copolymers.

The reaction of maleic anhydride with cyclic conjugated dienes such as cyclopentadiene and the isomeric methylcyclopentadienes yields the equimolar cyclic Diels-Alder adducts, endo-cis-5-norbornene-2,3-dicarboxylic anhydride and the 1-, 5- and 7-methyl substituted homologues, respectively. The endo maleic anhydride-cyclopentadiene adduct, m.p. 165° C., undergoes isomerization at elevated temperatures to the exo adduct, m.p. 143° C. Tthe isomerization takes place in the melt (D. Craig, J.Amer. Chem.Soc. 73, 4889 (1951) or in solution (C. Ganter, U. Scheidegger, and J. D. Roberts, J. Amer. Chem. Soc., 87, 2771 (1965). When either isomer is heated at a sufficiently elevated temperature, isomerization occurs and a mixture of both isomers is obtained. When the heating period is extended the equilibrium composition for that temperature is established. The various endo maleic anhydride-methylcyclopentadiene adducts, prepared from the 1-, 2- and 5-methylcyclopentadienes, similarly undergo isomerization to a mixture of the exo and endo adducts at elevated temperatures (V. A. Mironov, T. M. Fadeeva, A. U. Stepaniantz, and A. A. Akhrem, Tetrahedron Letters, 5823 (1966).

One object of the present invention is to provide novel copolymers of maleic anhydride and conjugated dienes.

Another object of the present invention is to provide novel copolymers of maleic anhydride and cyclic conjugated dienes.

A further object of the present invention is to provide a process for preparing such novel copolymers.

These and other objects of the present invention will become apparent from the ensuing description and illustrative embodiments.

In accordance with the present invention it has now been found that copolymers can be obtained by reacting maleic anhydride and cyclic conjugated dienes in the presence of free radical precursors.

The cyclic conjugated dienes which are useful for preparing the novel copolymers of this invention comprise cyclopentadiene and the isomeric methylcyclopentadienes.

The reaction may be carried out in bulk, e.g. in the molten state, or in the presence of an organic solvent which is inert towards anhydride functionality, i.e. a solvent which does not contain reactive hydrogen atoms such as alcohols, mercaptans or amines.

The required free radical precursors may be conventional polymerization catalysts, including azo compounds, dialkyl peroxides, diacyl peroxides, peresters, hydroperoxides, etc., e.g. azobisisobutyronitrile, benzoyl peroxide, tert-butyl peroxypivalate, tert-butyl peracetate, tert-butyl perbenzoate, tert-butyl hydroperoxide, etc. The free radical catalyst is used at concentrations of 0.5–10 mole-% based on monomers, and preferably at temperatures where the half-life is no more than 2 hours.

In accordance with one method of carrying out the present invention, the catalyst is added continuously or intermittently over a period of time, to the monomer mixture which is being maintained at the desired reaction temperature. The catalyst may also be added as a solution in an inert solvent to the monomers or a solution thereof at the desired temperature. Alternatively, a solution of the catalyst in the cyclic conjugated diene is added to molten maleic anhydride or a solution thereof at the desired reaction temperature. This latter process is a preferred method since it minimizes the formation of the Diels-Alder adduct which occurs in the absence of the catalyst.

When the reaction medium is a solvent for the copolymer, the latter may be precipitated therefrom with a non-solvent. When the medium is a non-solvent for the copolymer, the latter is precipitated during the course of the reaction.

When the reaction is carried out in bulk, the copolymer begins to precipitate from the reaction mixture shortly after the reaction is initiated by the addition of the catalyst. When the reaction is completed the mixture is diluted with acetone to dissolve the copolymer, which is then precipitated with chloroform. Other solvent-non-solvent compositions may be used to isolate the copolymer. The copolymer is soluble in methyl ethyl ketone and dioxane as well as acetone and insoluble in carbon tetrachloride, chlorobenzene, carbon disulfide, hexane and benzene as well as chloroform. It will be understood that the exact method of recovering the copolymer from the reaction mixture is not a critical feature of this invention, and that any of the known procedures may be readily employed.

The reaction occurs rapidly during the period of catalyst addition and is virtually complete shortly thereafter. Although the reaction may be terminated by cooling at that time, the reaction mixture is generally heated for an additional period to ensure maximum conversion.

The reaction temperature may range from about 0° to 300° C., and preferably about 50° to 300° C. Either atmospheric or superatmospheric pressure may be employed.

The molar ratio of maleic anhydride to cyclic conjugated diene may range from about 5:1 to 1:5 and preferably about 2:1.

elemental, infrared, and nuclear magnetic resonance analyses indicate that the novel copolymers of the present invention have essentially saturated structures derived from 2 moles of maleic anhydride and one mole of cyclopentadiene. The repeating unit of the copolymer chain may be represented by the formula:

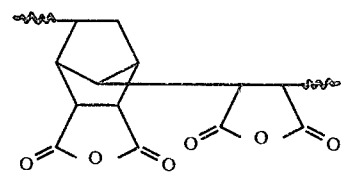

It has been disclosed that the radical catalyzed copolymerization of maleic anhydride and an acyclic conjugated diene yields an equimolar alternating copolymer in which the units derived from the conjugated diene have 1,4 unsaturation (U.S. Pat. No. 3,491,068). It is therefore surprising that the radical catalyzed copolymerization of maleic anhydride and a cyclic conjugated diene yields a saturated 2:1 copolymer.

The absence of unsaturation is confirmed from the infrared spectra of the copolymers, recorded as films cast on sodium chloride plates from acetone solution. The spectrum shows absorption peaks at 1760 and 1835 cm$^{-1}$, characteristic of copolymers containing maleic anhydride. Strong peaks are present at 1220, 1080, 940 and 900 cm$^{-1}$. The absence of absorption peaks at 1640 and 3050 cm$^{-1}$ indicates the absence of double bonds. An absorption peak at 730 cm$^{-1}$, characteristic of unsaturated polymers derived from cyclopentene and cyclopentadiene and present in the spectra of endo and exo 5-norbornene-2, 3-dicarboxylic anhydride, is absent in the spectra of the copolymers of this invention, indicating the absence of any significant amount of unsaturation.

The NMR spectra of the cyclopentadiene-maleic anhydride copolymers measured at 60 MHz in acetone-d$_6$ using tetramethylsilane as internal standard contain absorption peaks in the 5.5–9.1$\tau$ region, with particularly noticeable peaks at 6.1–6.3$\tau$, 6.4–7.2$\tau$, 8.1–8.4$\tau$, and 8.5–9.1$\tau$. The region between 8.1 and 8.82$\tau$ is assigned to the secondary methylene groups in the cyclopentane ring while the region between 5.0 8.1$\tau$ is assigned to the tertiary methine groups in the cyclopentane and succinic anhydride rings. Integration of the absorption peaks in these regions indicate that the copolymers contain one cyclopentane unit and two succinic anhydride units, in agreement with the elemental analyses of the copolymers.

The presence of catalyst residues in the copolymers is indicated by appropriate absorption peaks in the NMR spectra, e.g. absorption at 8.8–9.1$\tau$ when t-butyl peresters are used as catalysts.

A small amount of absorption at 3.5–4.5$\tau$ indicates that the copolymers generaly have no more than 5% unsaturation, probably as end groups.

The copolymers of the present invention contain repeating units consisting of alternating 5,7 linked bicyclo [2.2.1]heptane-2,3-dicarboxylic anhydride units and 1,2 linked succinic anhydride units.

The invention will be more fully understood by reference to the following illustrative embodiments:

EXAMPLE I

A flask equipped with stirrer, condenser, nitrogen inlet and dropping funnel was charged with 9.8 g. (100 mmoles) of maleic anhydride. The flask was placed in an oil bath at 80° C. and the maleic anhydride was stirred until it became moltene. A solution of 2.9 ml. (10 mmoles) of t-butyl peroxypivalate (75% in mineral spirits) in 6.6 g. (100 mmoles) of cyclopentadiene was added from the dropping funnel in 4 portions over a period of 10 min. The reaction mixture was maintained at 80° C. with stirring for an additional 20 min. The flask was removed from the oil bath and the reaction mixture was permitted to cool. The resultant solid mass was dissolved in acetone and the copolymer was precipitated with excess chloroform. After filtering, the product was dried in vacuo at 40° C. for 15 hrs. The yield of solid copolymer was 4.94 g. (38% calculated as the 1:2 cyclopentadiene-maleic anhydride copolymer).

For analytical purposes the copolymer was purified by solution in acetone and reprecipitation in chloroform.

Analysis: Calculated for 1:2 copolymer C$_{13}$H$_{10}$O$_6$: C, 59.5; H, 3.8 Found: C, 60.0; H, 5.1

The NMR spectrum showed peaks at 6.15–6.25$\tau$, 6.45–6.95$\tau$, 7.0–7.3$\tau$, 8.15–8.35$\tau$ and 8.55–9.05$\tau$.

EXAMPLE II

The copolymerization of 9.8 g. (100 mmoles) of maleic anhydride and 13.2 g. (200 mmoles) of cyclopentadiene was carried out at 80° C. in the same manner as described in Example I, using 4.4 ml. (15 mmoles) of t-butyl peroxypivalate as catalyst. The yield of 1:2 cyclopentadiene-maleic anhydride copolymer was 4.83 g. (37% as 1:2 copolymer). Elemental analyses confirmed the 1:2 copolymer composition. The NMR spectrum was essentially identical to that of the copolymer composition. The NMR spectrum was essentially identical to that of the copolymer in Example I.

EXAMPLE III

The copolymerization of 9.8 g. (100 mmoles) of maleic anhydride and 33.0 g. (500 mmoles) of cyclopentadiene was carried out at 80° C. in the same manner as described in Example I using 8.8 ml. (30 mmoles) of t-butyl peroxypivalate as catalyst. The copolymer yield was 3.92 g. (30% calculated at 1:2 cyclopentadiene-maleic anhydride copolymer). Elemental and NMR analyses confirmed the 1:2 copolymer composition. The copolymer had a softening point of 258°–260° C. and a molecular weight of 530 (cryoscopic in dioxane).

EXAMPLE IV

In accordance with the procedure described in Example I, 19.6 g. (200 mmoles) of maleic anhydride was copolymerized with 6.6 g. (100 mmoles) of cyclopentadiene at 80° C. using4.4 ml. (15 mmoles) of t-butyl peroxypivalate as catalyst. The yield of copolymer was 15.2 g. (58% based on 1:2 cyclopentadiene-maleic anhydride copolymer).

Analysis: Calculated for C$_{13}$H$_{10}$O$_6$: C, 59.5; H, 3.8. Found: C, 59.3; H, 5.0.

The copolymer had a softening point of 258°–260° C. and a molecular weight of 555 (cyroscopic in dioxane).

EXAMPLE V

The copolymerization of 29.7 g. (303 mmoles) of maleic anhydride with 10.0 g. (151 mmoles) of cyclopentadiene was carried out at 80° C., under the conditions described in Example I, using 6.2 ml. t-butyl peroxypivalate (23 mmoles) as catalyst. The yield of 1:2 cyclopentadiene-maleic anhydride copolymer was 15.7 g. (40%). The composition was confirmed by elemental analyses and NMR spectrum. The latter showed the characteristic absorptions at 6.15–6.25$\tau$, 6.5–6.9$\tau$, 8.1–8.2$\tau$, 8.25–8.35$\tau$, and 8.6–9.0$\tau$. The copolymer had a molecular weight of 740 (vapor phase osmometry).

EXAMPLE VI

A test tube was charged with 1.65 g. (17 mmoles) of maleic anhydride and 8.3 ml. of distilled dioxane. The tube was flushed with nitrogen, sealed with a rubber serum cap and placed in an 80° C. constant temperature bath. A solution of 0.4 ml. (1.33 mmoles) of t-butyl peroxypivalate in 1.1 g. (17 mmoles) of cyclopentadiene was added dropwise over 20 min. by hypodermic syringe. After an additional 40 min. at 80° C. the copolymer was precipitate by addition to chloroform. The copolymer yield was 1.05 g. (48%). The 1:2 copolymer, purified by solution in acetone and reprecipitation with chloroform, had a molecular weight of 840, as determined by vapor phase osmometry.

EXAMPLE VII

A yield of 1.40 g. (58%) was obtained when the 1:2 cyclopentadiene-maleic anhydride copolymer was prepared by the procedures described in Example VI, using 1.8 g. (18 mmoles) of maleic anhydride, 1.2 g. (18 mmoles) of cyclopentadiene and 0.45 ml. (1.5 mmoles) of t-butyl peroxypivalate at 80° C. The copolymer had an osmometric molecular weight of 850.

The NMR spectrum had the characteristic absorption peaks at 6.1–6.4τ, 6.5–6.9τ, 7.1–7.2τ, 8.1–8.2τ, and 8.75–9.0τ.

EXAMPLE VIII

The copolymerization of 1.2 g (12 mmoles) of maleic anhydride with 0.8 g. (12 mmoles) of cyclopentadiene using 0.3 ml. (1 mmole) of t-butyl peroxypivalate as catalyst at 80° C. was carried out in the presence of 1.8 ml. of chlorobenzene, using the procedure described in Example VI. The catalyst addition was carried out over a period of 10 min. and the reaction mixture was then maintained at 80° C. for an additional 50 min. The 1:2 cyclopentadiene-maleic anhydride copolymer was obtained in a yield of 0.64 g. (40%)

EXAMPLE IX

The procedure described in Example I was used in the copolymerization of 9.8 g. (100 mmoles) of maleic anhydride with 13.2 g. (200 mmoles) of cyclopentadiene at 105° C., using 1.4 ml. (6 mmoles) of t-butyl peracetate as catalyst. The latter was added in 4 portions over 10 min. and then maintained at 105° C. for an additional 20 min. The copolymer was obtained in a yield of 1.81 g. (14%). Elemental analyses confirmed the 1:2 composition of the copolymer which had a molecular weight of 860 (cryoscopy).

The NMR spectrum showed characteristic peaks at 6.2τ, 6.3τ, 6.5τ, 6.8τ, 7.1τ, 8.3τ and 8.7τ. There was no absorption indicative of unsaturation.

EXAMPLE X

A solution of 0.18 g. (2 mmoles) of t-butyl hydroperoxide-70 in 6.6 g. (100 mmoles) of cyclopentadiene was added dropwise over 10 min. to 9.8 g. (100 mmoles) of molten maleic anhydride at 155° C. Heating was continued for an additional 15 min. at 155° C. After solution in acetone and precipitation with chloroform, the yield of copolymer was 3.68 g. (28%). The copolymer had a softening point of 290° C. and its elemental analysis confirmed the 1:2 composition.

EXAMPLE XI

The addition of 0.45 ml. (2 mmoles) of t-butyl peracetate in 2.2 g. (33 mmoles) of cyclopentadiene over a period of 20 min. to 3.3 g. (34 mmoles) of molten maleic anhydride at 155° C., followed by 20 min. at 155° C., resulted in the recovery of 3.90 g. (88.6%) of 1:2 copolymer. The latter had a molecular weight of 790 (osmometry). In addition to the usual NMR absorption peaks at 6.15–6.45τ, 6.5–6.6τ, 6.9τ, 7.1τ, 8.3τ, and 8.7τ, a small peak at 4.25τ indicated the presence of a small amount of unsaturation.

EXAMPLE XII

The procedure described in Example I was repeated using 6.6 g. (100 mmoles) of cyclopentadiene, 9.8 g. (100 mmoles) of maleic anhydride and 0.9 ml. (4 mmoles) of t-butyl peracetate at a reaction temperature of 155° C. The yield of 1:2 copolymer was 7.46 g. (56.9%). The copolymer had a softening point of 275°–280° C. and a cryscopic molecular weight of 945.

EXAMPLE III

Under the same conditions as described in Example I, 33.0 g. (500 mmoles) of cyclopentadiene, 9.8 g. (100 mmoles) of maleic anhydride and 2.8 ml. (12 mmoles) of t-butyl peracetate at a temperature of 155° C., gave a 6.96 g. (53%) yield of 1:2 copolymer. The elemental analyses were in excellent agreement with the calculated values for the 1:2 copolymer.

EXAMPLE XIV

The copolymerization of 6.6 g. (100 mmoles) of cyclopentadiene and 19.6 g. (200 mmoles) of maleic anhydride, using 1.4 ml. (6 mmoles) of t-butyl peracetate at 155° C., gave a 10.3 g. (39.3%) yield of 1:2 copolymer. The latter had a softening point of 260° C. and a cryoscopic molecular weight of 720.

EXAMPLE XV

The procedure described in Example I was repeated using 6.6 g. of cyclopentadiene, 9.8 g. of maleic anhydride and 0.3 ml. (2 mmoles) of t-butyl hydroperoxide-70 at a reaction temperature of 180° C. The yield of 1:2 copolymer was 5.0 g. (38%).

EXAMPLE XVI

A solution of 0.3 ml. of t-butyl hydroperoxide-70 in 6.6 g. of cyclopentadiene was added in 4 portions over 10 min. to 9.8 g. of maleic anhydride at 205° C. After a subsequent 15 min. heating period at 205° C., the 1:2 cyclopentadiene-maleic anhydride copolymer was obtained in a yield of 4.5 g. (34%). When the additional heating period was increased from 15 min. to 80 min. at 205° C., the yield was increased to 5.0 g. (38%). The copolymer had a softening point of 280° C.

EXAMPLE XVII

The procedure of Example XVI was repeated by adding 3.0 ml. of t-butyl hydroperoxide-70 in 19.8 g. (300 mmoles) of cyclopentadiene to 9.8 g. (100 mmoles) of maleic anhydride at 205° C. The addition time was 10 min. and the additional heating time at 205° C. was 20 min. The yield of 1:2 copolymer was 6.1 g. (46.6%). The copolymer had a softening point of 275°–280° C. and a cryoscopic molecular weight of 595. The NMR spectrum contained the same peaks as observed in the spectra of the copolymer obtained at lower temperatures.

EXAMPLE XVIII

The procedure of Example XVI was repeated with the addition of 0.9 ml. of t-butyl hydroperoxide-70 in 6.6 g. (100 mmoles) of cyclopentadiene to 19.2 g. (200 mmoles) of maleic anhydride at 205° C. The addition time was 10 min. and the period of post-addition heating was 20 min. The yield of 1:2 copolymer was 24.5%.

The novel polymers of this invention may be converted into numerous derivatives by any of the known reactions for organic compounds containing anhydride groups. Thus, for example, the polymers containing anhydride groups may be hydrolyzed to produce recurring units which are dicarboxylic acids and which in turn may be converted to mono- or dicarboxylic acid salts. The carboxylic acid groups may be esterified with monohydric alcohols or diazolalkanes to yield monoester acids or diesters, respectively. The anhydride groups may be reacted with monohydric alcohols to produce monoester acids or diesters, depending upon the relative amount of alcohol and the reaction conditions. The anhydride groups may also be reacted with amines to yield monoamide acids or diamides or imides and with ammonium hydroxide to produce the mono- or diammonium salts as well as the monoamide-monoammonium salt. Since the polymer contains numerous anhydride groups, by controlling the quantity of reagent it is possible to control the extent of reaction.

The novel homopolymers of the present invention may be employed as thickeners, stabilizers, dispersants, binders, emulsifiers, textile and paper sizing agents, leveling agents in floor polishes, etc.

The polyanhydrides or half acids may be utilized to cure epoxy, alkyd, amine-formaldehyde, thermosetting acrylic and other resins containing reactive functional groups or may themselves be cured by agents containing such functionality.

While particular embodiments of this invention are shown above, it will be understood that the invention is obviously subject to variations and modifications without departing from its broader aspects.

What is claimed is:

1. A process for the preparation of saturated 2:1 copolymers of maleic anhydride and a cyclic conjugated diene said diene selected from the group consisting of cyclopentadiene and methylcyclopentadiene, which comprises heating maleic anhydride and said diene in the presence of a free radical precursor selected from the group consisting of peroxides, peresters and hydroperoxides, at a reaction temperature at which the free radical precursor has a half life of no more than two hours.

* * * * *